United States Patent [19]
Erwin, Jr.

[11] 3,774,047
[45] Nov. 20, 1973

[54] SHUNTLESS REPLACEMENT COIL SET FOR AUTOMOBILE STARTER MOTORS

[75] Inventor: Henry P. Erwin, Jr., Pasadena, Calif.

[73] Assignee: Precision Field Coil Company, Los Angeles, Calif.

[22] Filed: Nov. 29, 1972

[21] Appl. No.: 310,278

Related U.S. Application Data

[63] Continuation-in-part of Ser. No. 253,396, May 15, 1972, and a continuation-in-part of Ser. No. 127,928, March 28, 1971, Pat. No. 3,708,682.

[52] U.S. Cl.................... 290/38 R, 290/48, 310/67, 310/208
[51] Int. Cl............................................. F02n 11/00
[58] Field of Search................. 290/37 R, 38 R, 48; 310/67, 208; 123/179 R, 179 M

[56] References Cited
UNITED STATES PATENTS
2,923,830   2/1960   Merriam, Sr. et al............ 290/38 R
3,030,518   4/1962   Jensen............................. 290/38 R Primary Examiner—J. D. Miller
Assistant Examiner—Harry E. Moose, Jr.
Attorney—Robert L. Parker et al.

[57] ABSTRACT

An improved replacement field coil set is provided for automobile starter motors of the movable pole type having four field coils for which one "dual-purpose" coil serves as a pull-in and hold-in coil for the movable pole-piece in addition to serving as a field coil for inducing rotation of the motor armature. The four coils of the improved coil set are interconnected in a one-and-three series-parallel relation to each other in which the dual-purpose coil is connected in parallel with the three remaining field coils, which in turn are interconnected with each other in series. The dual-purpose coil comprises a single winding formed by a single conductor of predetermined turns and dimensions so selected that the coil pulls the movable pole-piece into the center of the coil during current flow through all coils and holds the movable pole-piece in its pulled-in position without chatter of the movable pole-piece during no-load operating conditions of the motor. The coils are electrically connected between the battery and the armature in a shuntless circuit so that electric current flows through all coils to the armature when the movable pole-piece is pulled in and held in by the dual-purpose coil.

5 Claims, 4 Drawing Figures

PATENTED NOV 20 1973 3,774,047

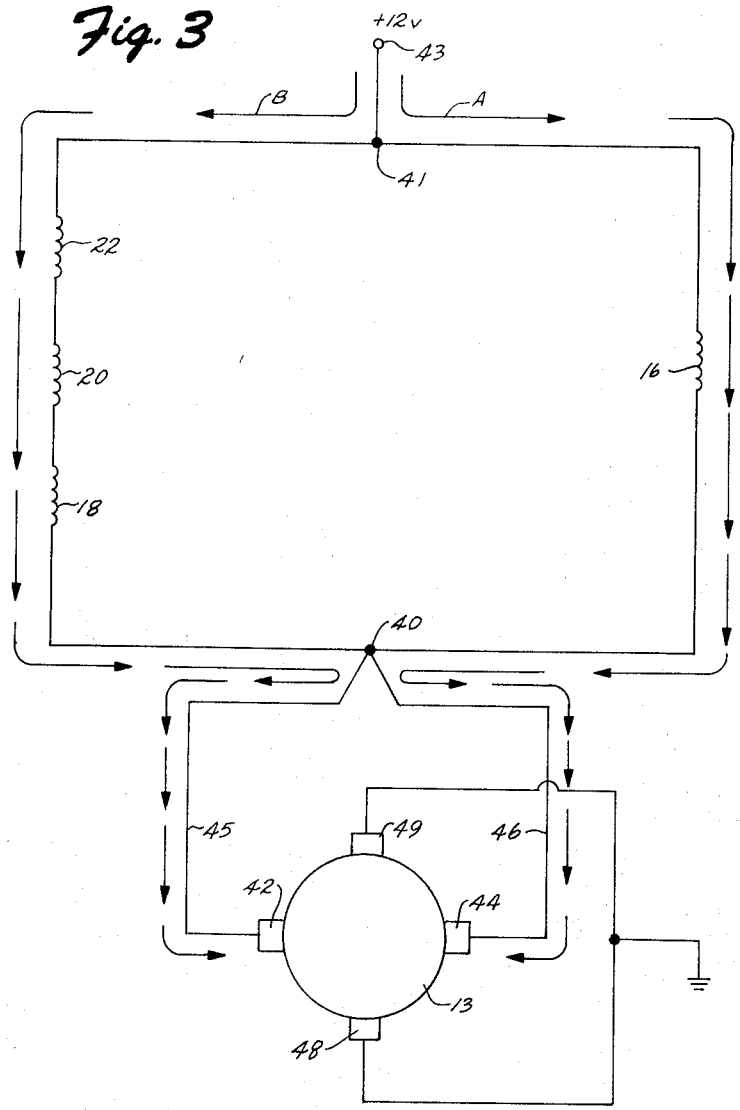

SHUNTLESS REPLACEMENT COIL SET FOR AUTOMOBILE STARTER MOTORS

CROSS-REFERENCE TO RELATED APPLICATIONS

This application is a continuation-in-part of my copending applications Ser. No. 253,396, filed May 15, 1972, and Ser. No. 127,928, filed Mar. 28, 1971 now U.S. Pat. No. 3,708,682.

BACKGROUND OF THE INVENTION

1. Field of the Invention

This invention pertains to automobile starter motors and, more particularly, to replacement field coil sets for automobile starter motors of the movable pole-piece type.

2. Review of the Prior Art

Automobile starter motors are electric motors which are mounted to the automobile engine for selective coupling of the starter motor armature with the flywheel which conventionally is connected to the engine crankshaft. During use of the starter motor to crank the engine, the starter motor armature shaft is coupled to the flywheel via a pinion gear which is slidable along the starter motor armature shaft into and out of engagement with gear teeth defined on the rim of the flywheel. The pinion gear normally is biased by a suitable spring out of engagement with the flywheel. The pinion gear is moved into engagement with the flywheel by the operation of a solenoid which is energized during energization of the starter motor itself. The solenoid may be provided independently of the field coils in the starter motor, or the solenoid may have its winding formed by at least a part of one of the motor field coils. This invention is concerned with starter motors of the latter type, namely, starter motors of the movable pole-piece type in which the movable pole-piece forms a part of the solenoid armature.

Movable pole-piece automotive starter motors are used as original equipment in many of the vehicles made by the Ford Motor Company. In such starter motors, a plurality of field coils, usually four in number, are disposed in the motor housing for cooperation with the motor armature. An opening is provided in the housing in alignment with the center of one of the field coils, hereafter referred to as a dual-purpose coil. The motor includes a magnetic pole-piece cooperating with each of four field coils. The pole-piece associated with the dual-purpose coil pivots on the motor housing for movement from a normal position out of the opening during conditions when the starter motor is not being used. During use of the starter motor, current is directly initially only through the dual-purpose coil to pull the movable pole-piece into the housing opening, and such movement advances the starter motor pinion gear along the starter motor shaft into engagement with the flywheel gear teeth. Such movement of the movable pole-piece opens a normally closed shunt switch connected to ground across the remaining field coils. After the shunt switch is opened, the dual-purpose coil functions both as a field coil to induce armature rotation and also to hold the movable pole-piece in its pulled-in position. It is particularly important that the dual-purpose coil function satisfactorily to maintain the pole-piece in its pulled-in position against the bias normally driving the pinion gear out of engagement with the flywheel. Since the coil functions both to pull in and hold in the movable pole-piece, and also functions as a field coil with the remaining coils of the starter motor, it is referred to as a dual-purpose coil.

Movable pole-piece starter motors are known colloquially as "Falcon" starter motors because they were originally developed for use with the Falcon line of automobiles. Falcon starter motors are provided in a 4-½ inch size and in a smaller 4 inch version; the terms "4-½ inch" and "4 inch" are used with reference to the diameter of the starter motor housing. As manufactured by the Ford Motor Company and its suppliers, the dual-purpose coils of these starter motors consist of a pull-in winding formed by a small number of turns of a conductor of relatively large cross-sectional area, and by a hold-in winding formed by a large number of turns of a conductor of relatively small cross-section. Prior to movement of the movable pole-piece sufficient to produce opening of the shunt switch, the current supplied to the starter motor flows only through the pull-in winding. After the movable pole-piece has pulled in to its operative position, the shunt switch is opened so that all field coils, including both the pull-in and hold-in windings of the dual-purpose coil, are energized. The current which flows through all the field coils is less than the initial current flow through the pull-in winding and the remaining field coils. Thus, the magnetic field strength developed by the dual-purpose coil of existing original-equipment movable pole-piece starter motors is reduced when current is directed to all of the coils.

Under no-load conditions, an original-equipment 4-½ inch Falcon starter motor will draw a current of about 60 amps at full speed, assuming no chatter in the movable pole-piece assembly. As load increases, current demand increases until the load is sufficient to stall the motor, at which time the current flow through the coil is about 500 amps. The usual operational load of a starter motor of this type produces a current flow of from 200 to 300 amps. If an original-equipment Falcon starter motor, for example, is abused in use, as by extended operation in attempting to start a cold or otherwise hard-to-start engine, the fine wire hold-in winding of the original dual-purpose coil tends to burn out. The hold-in winding and the pull-in winding of a dual winding, dual-purpose coil for a movable pole-piece starter motor are intended to cooperate with each other to hold the movable pole-piece in its housing opening as the motor is operated to crank the engine. The pull-in winding itself is not adequate, following opening of the shunt switch, to hold the movable pole-piece during no-load or light-load operation of the motor due to the added resistance provided by the other coils of the set. Thus, the presence of a burned out hold-in coil in an original-equipment starter motor of the movable pole-piece type means that the movable pole-piece will not hold in even under no-load conditions.

Because the movable pole-piece is spring biased to a normal position out of the housing opening associated with the dual purpose coil, the movable pole-piece always tends to move out of intimate cooperative relation with the dual-purpose coil. If such movement occurs during energization of the motor by reason of a defective hold-in winding, the shunt to ground around the hold-in winding and the other coils of the starter motor is opened, thereby reestablishing the initial current flow conditions through the pull-in winding. This event causes the movable pole-piece to tend to be drawn back into intimate cooperative relation with the dual-purpose coil and the shunt to be reopened. Reopening of the shunt causes the movable pole-piece to again move away from the dual-purpose coil, and so on. This cyclic movement of the movable pole-piece is referred to as "chatter" of the starter motor. The presence of chatter in a starter motor, whether an original-equipment starter motor or a rebuilt starter motor, under no-load conditions is essentially universally regarded as indicative of a defective motor.

In the trade concerning rebuilt automotive starters there are several levels of operation. The upper level constitutes manufacturers of replacement parts for starters, and such manufacturers sell to businesses which rebuild starter motors. The rebuilders sell to wholesalers, who sell to distributors and automotive parts stores, who in turn sell to garages and mechanics who install the rebuilt starters in the vehicles of their customers. The rebuilt starters are subjected to operability tests at least by the rebuilder and by the mechanic, and also often by others in the chain. The conventional operability test for rebuilt starters of the movable pole-piece type is to connect the starter motor across a DC potential (an automotive battery) and to operate the motor under no-load conditions to ascertain that the motor armature rotates and that the movable pole-piece pulls in and holds in within the housing opening associated with the dual-purpose coil. If the rotor fails to turn, or if the movable pole-piece fails to hold in the opening, the conclusion is that the rebuilt starter is defective and the starter is rejected. Thus, the presence of chatter in a rebuilt starter motor is evaluated under no-load full speed operating conditions of the motor. The principal cause of chatter in original-equipment movable pole-piece starter motors is the tendency of the fine wire hold-in winding of the original dual-purpose coil to burn out in use.

Under no-load conditions, at full speed, the current flow through the field coils of the movable pole-piece starter motor is significantly lower than the current flow through the same coils during normal in-use load conditions. The result is that there is relatively little current available during the above-described rebuilt motor operability test to hold in the movable pole-piece and to prevent chatter. The problem of chatter, therefore, is a major problem which is faced by the manufacturers of replacement coil sets for automotive starter motors. This problem must be overcome by such manufacturers if they are to produce marketable products.

It is significant that the no-load operability test for chatter pertinent to starter motors of the movable pole-piece type was developed initially by automotive mechanics presented with customers complaining of starting problems in the customers' vehicles. If the test showed the presence of chatter, the correct conclusion was that the hold-in coil had burned out and that a new or rebuilt starter motor was required. The no-load operability test for chatter is a valid test only for original-equipment starter motors of the movable pole-piece type where the motors have been found, by use, to present problems.

Another significant fact is that, in use, starter motors (whether they are original-equipment motors or rebuilt motors) never operate under no-load conditions, but rather always operate under load conditions producing at least 200 amps current flow through the motor coils. Since many completely new original-equipment movable pole-piece starter motors manifest problems of chatter when operated under no-load conditions, it is apparent that the manufacturers of such motors recognize that starter motors normally never operate under no-load conditions; therefore, these manufacturers do not concern themselves with chatter at no-load conditions. The persons in the trade of rebuilt starter motors, including automotive mechanics who must diagnose starting problems in customers' vehicles, on the other hand, attach paramount significance to the problem of chatter of the movable pole-piece under no-load conditions.

It is thus apparent that the no-load operability test is not necessarily a valid test for other original starter motors of other types or for rebuilt movable pole-piece starter motors which may chatter under no-load conditions, but not under load conditions. The problem of chatter in a rebuilt starter motor, therefore, is a very real practical problem faced by the manufacturers of rebuilt starter motors and replacement coil sets, but not by the manufacturer of original-equipment movable pole-piece starter motors.

A basic objective of the rebuilt starter motor industry is to provide rebuilt motors which are superior to original motors, and are far less prone to failure than original motors. This objective must be reached within design limitations of size and shape imposed by the structure of the original motors. That is, the replacement field coil set for a rebuilt starter motor must fit within the coil spaces provided in the original motor. Replacement coil sets cannot be sized and configured so as to require reworking of the casing or other elements of the original motor. The objective of superior in-use performance must be reached by the replacement coil manufacturer at the same time that the manufacturer is successfully overcoming the largely illusory problem of chatter. Superior performance is often achieved by the use of heavier gage wire and heavier and better insulation in the replacement coil set, and the problem of chatter usually is overcome by providing greater ampere turns in the pull-in and hold-in windings for the dual-purpose coil. However, these approaches to the matter of superior performance are at odds with the space limitations imposed by the design of the original motor. It is apparent, therefore, that a need exists for a replacement field coil set for starter motors of the movable pole-piece type which is usable directly in the coil spaces provided in the original motor, which is not subject to problems of chatter under no-load or load conditions, and which is superior in performance and useful life to the field coils encountered in the original-equipment starter motors.

Also, to simplify the rebuilding process, it is desirable that the rebuilding operation involve minimum disassembly of the original-equipment motor. For this reason it is desirable that the replacement field coil set be capable of insertion directly into the coil spaces from one end of the starter motor, so that the rebuilding process may be carried out quickly and efficiently without extensive disassembly and reassembly of the starter motor. It is also desirable that the replacement coil sets be arranged to include minimal interconnecting conductors between the several coils of the set so that the replacement coil set may be fabricated quickly and efficiently and may be marketed at the lowest cost possible.

The problem of chatter at no-load is partially solved by the improved replacement field coil set disclosed in the above-mentioned patent application Ser. No. 253,396. The dual-purpose coil disclosed in that application is connected to ground through a normally closed shunt switch. The dual-purpose coil pulls the movable pole-piece into the center of the coil during initial current flow only through the dual-purpose coil. This movement of the pole-piece opens the shunt switch which then allows current to flow to the motor armature through all four field coils in the coil set. As discussed above, this change in current flow through the coils reduces the field strength developed by the dual-purpose coil for holding the movable pole-piece in its pulled-in position. Moreover, a biasing spring continuously tends to move the pole-piece out of its held-in position in the dual-purpose coil. Because of the reduced field strength during the hold-in cycle, and the tendency of the biasing spring to oppose movement of the pole-piece to its held-in position, the winding of the dual-purpose coil must be limited to a specific number of turns and dimensions, and the spring biasing force must be carefully controlled, to provide sufficient starting power and still be able to avoid chatter at no-load and during load conditions. This increases the time and expense required to rebuild the starter motor, and also increases the chance of chatter occurring after the starter motor has been in use for a prolonged period of time.

SUMMARY OF THE INVENTION

This invention provides an improved replacement coil set for an automotive starter motor of the movable pole-piece type. The present replacement coil set is not subject to problems of chatter at no-load operating conditions and, therefore, is readily marketable in the trade pertinent to rebuilt automotive starter motors.

Briefly, the improved replacement field coil set has four field coils, one of which is a dual-purpose coil serving as a pull-in and hold-in coil for a movable pole-piece in addition to serving as a field coil for inducing rotation of the motor armature. The four coils are electrically interconnected in a one-three series-parallel relation to each other in which the dual-purpose coil is connected in parallel with the three remaining field coils, which in turn are interconnected with each other in series. The dual-purpose coil comprises a single winding of a single conductor of predetermined turns and dimensions sufficient that it operates to pull the movable pole-piece into the center thereof during current flow through all coils and hold the movable pole-piece in its pulled-in position without chatter of the movable pole-piece during no-load operating conditions of the motor. The coils are electrically connected between the battery of the automobile and the armature in a shuntless circuit so that electric current flows through all coils to the armature when the movable pole-piece is pulled in and held in by the dual-purpose coil.

The improved coil set of this invention is superior to other prior art replacement coil sets, because it eliminates the conventional shunt switch and the tendency of the switch contacts to spring back and therefore work against hold-in of the movable pole-piece. This increases the hold-in power of the motor and reduces substantially the chance that the present starter motor will chatter at no-load or during use. Moreover, replacement time and cost are reduced because there is no need to replace the shunt switch contacts.

Furthermore, the one-three series-parallel arrangement of the field coils, together with the shuntless connection, eliminates any sudden drop in field strength of the dual-purpose coil during the hold-in cycle. The large field strength produced by the dual-purpose coil during the pull-in cycle is continuously maintained throughout the hold-in cycle. This increased field strength locks the movable pole-piece in its held-in position and thereby reduces the chances of chatter occurring.

The substantially reduced tendency for chatter to occur in the coil set of this invention also makes it possible to provide a good range of acceptable tolerances on the number of turns and dimensions of the dual-purpose coil winding. This reduces the cost and time needed to repair the replacement motor, and also makes it possible to replace certain parts of the motor, such as the armature, for example, with like parts produced by other manufacturers without encountering chatter at no-load or during load conditions.

Further, the present coil set is so defined that it incorporates minimal interconnection between the several coils of the set, thereby making the coil set simple to insert into position in the motor casing with minimal disassembly of the motor casing. The dual-purpose coil of the present coil set is superior to original-equipment dual winding, dual-purpose coils because the present dual-purpose coil does not rely upon conductors of very small cross-sectional areas to provide the hold-in function required of the dual-purpose coil.

BRIEF DESCRIPTION OF THE DRAWINGS

These and other aspects of the invention will be more fully understood by referring to the following detailed description and the accompanying drawings in which:

FIG. 3 is a schematic electrical diagram of the circuitry for the coil set shown in FIG. 2 when it is used with the motor shown in FIG. 1.

DETAILED DESCRIPTION OF THE PREFERRED EMBODIMENT

Figure 1:
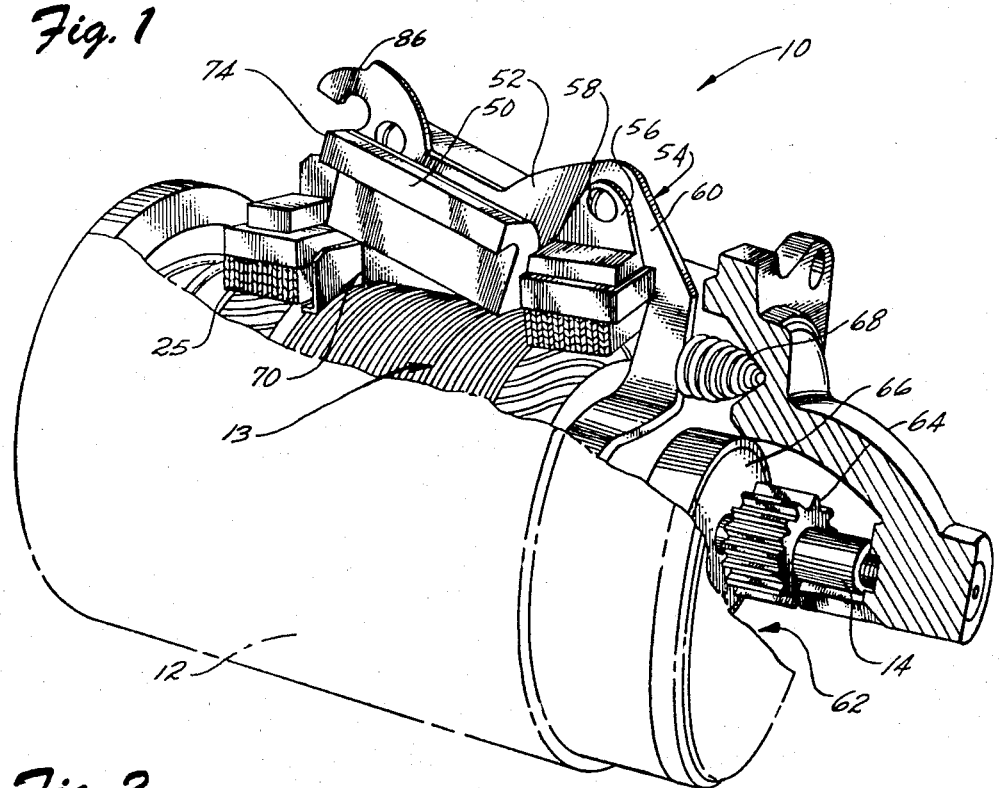
FIG. 1 is a perspective cut-away view of an automobile starter motor of the movable pole type.

Referring to the drawings, an automobile starter motor 10 embodying the principles of this invention comprises a four-pole DC motor commonly used on Ford Falcon automobiles, for example. Motor 10 includes a cylindrical housing 12 in which is contained a conventional commutator/armature assembly 13, referred to hereafter as "the armature". The armature surrounds a shaft 14 which rotates in response to the flow of current through a field coil set 27 comprising four field coils 16, 18, 20 and 22 mounted within the housing in quadrature disposition about the armature.

Figure 2:
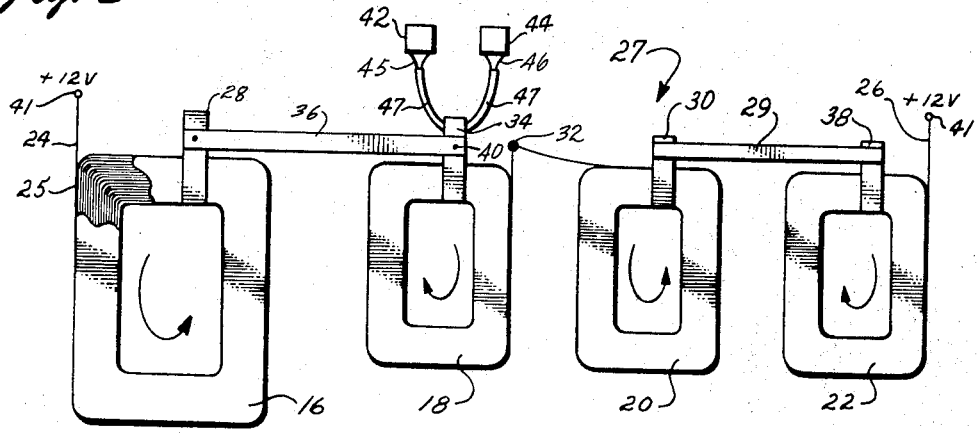
FIG. 2 is a simplified semi-schematic illustration of the replacement coil set provided by this invention for use in the motor shown in FIG. 1.

As shown best in FIGS. 2 and 3, the field coils are connected together in what may be termed a one-and-three series-parallel connection, in that adjacent coils 18, 20 and 22 are connected in series with each other, and coil 16 is connected in parallel with coils 18, 20 and 22 between junction points 40 and 41. An outer end 24 of coil 16 and an outer end 26 of coil 22 are each connected through junction 41 to the positive terminal 43 of a 12 volt automobile battery (not shown). An inner end 28 of coil 16 is connected via an interconnecting conductor 36 to an inner end of coil 18 at junction point 40. An inner end 38 of field coil 22 is connected via an interconnecting conductor 29 to an inner end 30 of field coil 20. The outer end of field coil 20 is welded at 32 to the outer end of field coil 18.

Each of field coils 18, 20 and 22 has an associated field pole (not shown) which is fixedly mounted within motor housing 12 and is positioned within the center opening of the respective coil. Coil 16, when operating as a field coil, also has a field pole 50 positioned in its center. Field pole 50, however, is movably mounted to motor housing 12 for movement into and out of an operating position with the center of coil 16.

As shown in FIGS. 2 and 3, a pair of brushes 42 and 44 are connected to junction point 40 by respective pairs of conductors 45 and 46, each disposed in a sleeve of suitable insulation material 47. The brushes are disposed at opposite sides of the armature when coil set 27 is properly installed in motor 10. These brushes are hereafter referred to as the "hot brushes" since they are connected directly to the battery through the field coils. An additional pair of brushes 48 and 49 are each positioned on opposite sides of armature 13 in quadrature relation to brushes 42 and 44.

When current is directed flow through all four coils in the manner described below, it follows two separate paths which are defined in parallel. Referring to FIG. 3, a first current path A is defined from junction 41 through coil 16 in series with hot brush 44 through junction 40. A second current path B is defined from junction 41 through coils 18, 20 and 22 in series with hot brush 42 through junction 40.

Upon energization of all four field coils in coil set 27, the current flow through the coils along paths A and B sets up a magnetic field about the armature to produce a counterclockwise torque contributing in part to a corresponding rotation of the armature. Additional torque to cause armature rotation is produced by the flow of current into and out of a number of conductors (not shown) embedded in longitudinal slots in the surface of the armature as is known from the general principles of operation of DC motors. Current is let into and out of these conductors when the hot brushes make contact with the commutator portion of the armature. The commutator defines a predetermined current flow path through the conductors such that the magnetic field developed as current flows through each conductor produces a counterclockwise torque on the armature to assist the torque developed by the field coils.

Coil 16 is used not only as a field coil for inducing rotation of armature 13, but also as a solenoid. It is for this reason, as noted above, that coil 16 is referred to as a dual-purpose coil.

Field pole 50, provided for cooperation with dual-purpose coil 16, is carried on the underside of the rear end of a lever arm 52 which comprises a part of a control assembly 54. The lever arm is of unitary construction and is hinged by a hinge pin 58 intermediate its ends to a hinge bracket 56 affixed to the outer surface of motor housing 12. The forward end of lever arm 52 defines a fork 60 which cooperates with opposite sides of a drive gear assembly 62 slidably mounted on armature shaft 14 for rotation with the armature, but yet selectively movable axially along the armature shaft.

Drive gear assembly 62 includes a gear 64 for engaging corresponding gear teeth (not shown) defined on a flywheel (not shown) of an automobile engine with which starter motor 10 is used. Drive gear assembly 62 further includes an overrunning clutch for preventing the starter motor armature from being driven by the flywheel after the engine to which the flywheel is connected has been started by operation of the starter motor. A spring 68 is biased between the motor housing and the forked end of lever arm 52 to bias the lever arm to a normal position, shown in FIG. 1, in which movable pole-piece 50 is disposed out of a receiving aperture 70 formed in the motor housing. Aperture 70 is defined to coincide with the center opening of dual-purpose coil 16. This normal position of lever arm 52 corresponds to a retracted position of gear drive assembly 62 along armature shaft 14 in which gear 64 is disengaged from the flywheel gear teeth. Conversely, when lever arm 52 is moved sufficiently about hinge pin 58 to provide engagement of pinion gear 64 with the flywheel gear teeth, the movable pole-piece carried by the lever arm is disposed within receiving aperture 70 to be located within the center opening of dual-purpose coil 16.

The conventional starter motor heretofore has included a normally-closed shunt switch (not shown) defined in part by a leaf spring (not shown) which is mounted on the outer surface of the motor housing adjacent the rear end of receiving aperture 70. The shunt switch conventionally is connected between dual-purpose coil 16 and ground. The switch contacts are normally biased into contact with each other by the leaf spring, and in this state a circuit path is defined enabling current to flow from the battery only through dual-purpose coil 16 to ground. So long as shunt switch contacts are closed, current does not flow through field coils 18, 20 and 22, because of the added impedance represented by the remaining field coils and by armature 13. The shunt switch is operated into its open state when current initially flows through dual-purpose coil 16. Such current flow occurs when the ignition key is turned in the vehicle to connect the battery to motor energization terminal 43, i.e., to the outer ends of field coils 16 and 22. This initial flow of current through coil 16 sets up a magnetic field about the coil which attracts movable pole-piece 50 toward the coil and to move lever arm 52 against the bias of spring 68 sufficiently that pole-piece 50 moves into its pulled-in-position within aperture 70. The rear end of lever arm 52 carries a lug 86 which is so positioned that, upon movement of the movable pole-piece into aperture 70, the lug engages and depresses the leaf spring to open the switch contacts. Opening of the shunt switch contacts removes the shunt across field coils 18, 20 and 22 and across armature 13. Removal of this shunt allows current to flow from the battery via the motor energization terminal 43 through all of the field coils and the armature to ground. As noted above, this operation of the shunt switch causes drive gear assembly 62 to move along armature shaft 14 into engagement with the flywheel gear teeth so that continued operation of the starter motor produces cranking of the automobile engine.

This operation of the switch also causes a sudden reduction in the field strength of the dual-purpose coil necessary to hold pole-piece 50 in aperture 70. As noted above, this reduced field strength increases the chances of chatter occurring at no-load and under load conditions. Moreover, the biasing spring associated with the shunt switch applies a continuous bias to the movable pole-piece which always tends to move pole-piece 50 out of aperture 70. This operation of the biasing spring also tends to increase the chances of chatter occurring, as noted above.

Replacement coil set 27 eliminates the shunt switch and its associated biasing spring. Thus, as shown best in FIG. 3, current always flows through all four coils, rather than coil 16 alone, when the ignition key is turned in the vehicle to connect the battery to motor energization terminal 43. This flow of current through coil 16 produces a magnetic field about coil 16 which attracts movable pole-piece 50 toward the coil and moves lever 52 against biasing spring 68 sufficiently to move pole-piece 50 into its pulled-in position within aperture 70.

Once the movable pole-piece is in its pulled-in position, it is held there by the magnetic field strength developed by coil 16. The absolute magnitude of the field strength of coil 16 is not reduced during hold-in operations, as is characteristic of the prior art starter motors. Therefore, this field strength is available during the hold-in portion of the operating cycle to maintain pole-piece 50 in its pulled-in position so long as the field coils are connected to the battery. Tests on a 4-½ inch Falcon high-torque starter motor have shown that an absolute holding force of about 20 pounds is produced by coil 16 throughout pull-in and hold-in operating conditions. Conversely, in the shunt-operated starter motor referred to in application Ser. No. 253,396 described above, only about 5 pounds of hold-in force was developed by the dual-purpose coil during the hold-in portion of the operating cycle.

A typical prior art dual-purpose coil has a seven-turn pull-in winding defined by a conductor having a cross-sectional area of approximately 0.0002 square inch. It is this fine-wire, many turn hold-in winding which manifests a disturbing tendency to burn out during use of the motor.

By way of example, the single winding 25 of the present dual-purpose coil used in a 4-½ inch Falcon starter motor preferably has 15 turns defined by a single length of strip-like conductor having a width of 0.280 inch and a thickness of 0.030 inch (0.0084 square inch cross-sectional area). Because of the increased hold-in power of the present field coil set, the number of windings and dimensions of winding 25 can vary and still prevent chatter at no-load and during prolonged periods of use. For example, a suitable winding for coil 16 can have as few as eleven turns, with a conductor width of from 0.265 inch to 0.280 inch and a thickness of from 0.030 inch to 0.040 inch (0.0080 to 0.0112 square inch cross-sectional area). When such a conductor is combined with suitable insulation, preferably cloth insulation, dual-purpose coil 16 is of the proper dimension to fit directly into the space provided for the dual winding, dual-purpose coil of an original-equipment 4-½ inch Falcon starter motor.

Field coils 18, 20 and 22 in some instances, may be defined from corresponding lengths of the same conductors used to define winding 25 of dual-purpose coil 16.

Coils 18, 20 and 22, as shown in FIG. 2, are of smaller overall dimension than dual-purpose coil 16 since coils 18, 20 and 22 serve only as field coils to rotate the motor armature. In the above-described 4-½ inch Falcon starter motor, coils 18, 20 and 22 preferably are defined by about six turns of the conductor having a width of 0.265 inch and a thickness of 0.040 inch (0.0106 square inch cross-sectional area). The number of turns of each winding and the dimensions of the conductor in these other windings also can vary within reasonable tolerances without causing chatter. For example, the thickness of each conductor can vary between 0.040 to 0.060 inch, and the width of the conductor can vary between about 0.265 to 0.280 inch. Within this range of conductor dimensions, the number of turns can vary from about four to seven, with the thickness of the conductor decreasing proportionally as the number of turns increases.

As shown best in FIG. 2, each of the field coils of coil set 27 are of rectangular configuration and include two parallel long sides and two parallel short sides. Each side, whether long or short, of each of the coils is considered to constitute one-fourth of a turn.

FIG. 2 also illustrates that each of field coils 16, 18, 20 and 22 has its inner and outer ends arranged along a common end of coil set 27. For the sake of convenience, the end of the coil set to which brushes 42 and 44 are connected is referred to as the upper end of the coil set. Also, it is seen from FIG. 2 that interconnecting conductors 29, 32 and 36 are also all disposed along the upper end of the coil set. There are no coil ends or interconnecting conductors provided along the lower end of the coil set. Thus, coil set 27 may be inserted easily into the coil spaces provided in an original-equipment starter motor which is to be rebuilt and in which the rebuilding process includes the insertion of coil set 27 into the motor housing in place of the coils originally provided. This phase of the motor rebuilding operation may be accomplished simply by removing merely one end closure of motor housing 12 and inserting the replacement coil set into the coil spaces. This procedure involves minimum disassembly and reassembly of the structure of motor 10.

Because dual-purpose coil 16 is defined by only a single winding of conductor of large cross-section, this winding is less subject to being burned out during continued use of the starter motor, as during cranking of a hard-to-start engine. Further, dual-purpose coil 16 is not susceptible to chatter under no-load operating conditions, and thus successfully overcomes a major problem faced by the manufacturers of the replacement coil sets used in the industry addressed to rebuilt starter motors.

The field coil set of this invention also provides a savings of time and money for the original manufacturer of the starter motor, because elimination of the shunt switch eliminates the time and cost involved in making the contact points, putting them in the motor case, and connecting them to the coils.

Figure 4:
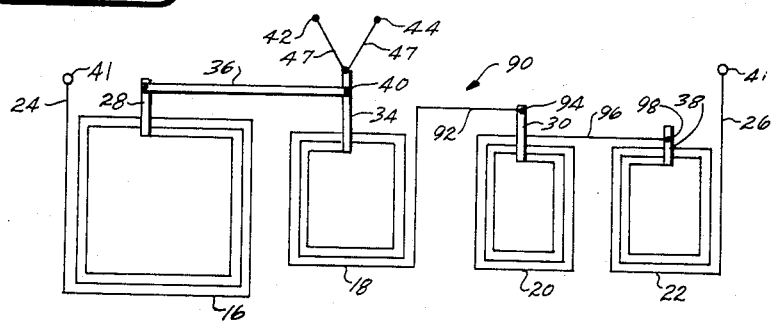
FIG. 4 is a schematic illustration of an alternate embodiment of the replacement coil set of this invention.

FIG. 4 shows an alternate coil set 90 which provides an additional cost savings for the original manufacturer of starter motors as well as the manufacturer of replacement coil sets. Coil set 90 is similar to coil set 27 in that it includes field coils 16, 18, 20, and 22 connected together in a one-three series-parallel connection. In coil set 90 field coils 16 and 18 are wound in the same direction and connected together the same way as in coil set 27. Field coil 22 of coil set 90 also is wound in the same direction as in coil set 27. However, field coil 20 of coil set 90 is wound in a reverse direction relative to the direction it is wound in coil set 27.

An outer end 92 of coil 18 is connected to inner end 30 of the reverse-wound field coil 20 by a weld 94. An outer end 96 of the reverse-wound coil 20 is connected to inner end 38 of coil 22 by a weld 98. This latter connection eliminates the need for an elongated copper connecting conductor, such as conductor 29 of coil set 27, and it also eliminates an additional weld, when the connection is compared with coil set 27. Thus, coil set 90 is capable of providing a substantial savings in copper conductor as well as in production time for the manufacturers of original coil sets and replacement coil sets.

Although the invention has been described above with respect to a specific starter motor having a dual-purpose coil of specific dimensions and turns, workers skilled in the art to which this invention pertains will recognize that modifications and alternations of the above-described coil set may be made without departing from the spirit of this invention. Accordingly, the foregoing description is not to be considered as limiting the scope of this invention.

I claim:

1. An improved replacement field coil set for an automobile starter motor of the movable pole type having four field coils, one of which comprises a dual-purpose coil which serves as a pull-in and hold-in coil for a movable pole-piece in addition to serving as a field coil for inducing rotation of a motor armature, the four coils being electrically interconnected in a one-three series-parallel relation to each other in which the dual-purpose coil is connected in parallel with the three remaining series-connected field coils, the dual-purpose coil comprising a single winding of a single conductor of predetermined turns and dimensions sufficient that it operates to pull the movable pole-piece into the center thereof during current flow through all four coils and holds the movable pole-piece in its pulled-in position without chatter of the movable pole-piece during no-load operating conditions of the motor, the coils being electrically connectible in a shuntless circuit directly between a motor-energization terminal and the motor armature so that electric current flows through all coils to the armature when the movable pole-piece is both pulled in and held in by the dual-purpose coil.

2. Apparatus according to claim 1 in which each of the four coils in the set has its inner and outer end disposed at a common end of the set, and including interconnecting conductors connected between the several coils at said common end of the set.

3. Apparatus according to claim 1 in which the single conductive winding of the dual-purpose coil has between about eleven and about 15 turns of a conductor having a cross-sectional area in the range of between about 0.0080 and about 0.0112 square inch.

4. Apparatus according to claim 3 in which each of the remaining field coils has between about four and about seven turns of a conductor having a cross-sectional area in the range of between about 0.0106 square inch and about 0.018 inch.

5. Apparatus according to claim 1 in which the three remaining series-connected field coils define a first field coil, a second field coil, and a third field coil, and in which the second field coil is wound in a direction opposite to that of the first and third field coils, and an outer end of the second field coil is connected to an inner end of the first field coil, and an inner end of the second field coil is connected to an outer end of the third field coil.

* * * * *

PO-1050
(5/69)

UNITED STATES PATENT OFFICE
CERTIFICATE OF CORRECTION

Patent No. 3,774,047      Dated November 20, 1973

Inventor(s) Henry P. Erwin, Jr.

It is certified that error appears in the above-identified patent and that said Letters Patent are hereby corrected as shown below:

Title on front page and in Column 1 should read "SHUNTLESS COIL SET FOR AUTOMOBILE STARTER MOTORS".

Column 1, line 8, after "1972" insert -- now Patent 3,733,494 --;
line 46, "dual-purpose" should be in quotes;
line 14, delete "replacement".

Column 5, lines 3 & 4, delete "application Ser. No. 253,396" and insert -- 3,733,494 --;
lines 4 & 5, delete "application" and insert -- patent --;
line 32, delete "replacement";
line 34, delete "replacement";
line 38, delete "replacement".

Column 6, line 41, delete "replacement";
line 47, delete "replacement".

Column 8, line 7, after "clutch" insert -- 66 --.

Column 9, line 33, delete "application Ser. No. 253,396" and insert -- Patent 3,733,494 --.

Column 11, line 25, delete "replacement".

Signed and sealed this 23rd day of April 1974.

(SEAL)
Attest:

EDWARD M. FLETCHER, JR.
Attesting Officer

C. MARSHALL DANN
Commissioner of Patents